United States Patent [19]

Meyer

[11] 3,966,155

[45] June 29, 1976

[54] CLIP FOR REMOTE CONTROL ROD

[75] Inventor: Engel A. Meyer, Bloomfield Hills, Mich.

[73] Assignee: USM Corporation, Boston, Mass.

[22] Filed: Feb. 10, 1975

[21] Appl. No.: 548,833

[52] U.S. Cl. ............................. 248/73; 24/73 SA
[51] Int. Cl.² ............................................. F16L 3/08
[58] Field of Search.......... 24/73 SA, 73 AP, 73 PB, 24/73 SB, 73 SC; 248/68 R, 71, 73, 74 A, 74 PB, 74 B

[56] References Cited
UNITED STATES PATENTS

| | | | |
|---|---|---|---|
| 1,246,325 | 11/1917 | Rohmer | 24/73 SA |
| 2,278,691 | 4/1942 | Cotter | 24/73 SA |
| 2,852,829 | 9/1958 | Holton et al. | 24/73 SA |
| 3,529,795 | 9/1970 | Van Niel | 248/71 |

*Primary Examiner*—Paul R. Gilliam
*Assistant Examiner*—Kenneth J. Dorner
*Attorney, Agent, or Firm*—Aubrey C. Brine; Vincent A. White; Richard B. Megley

[57] ABSTRACT

A one piece clip is provided for slidably retaining a rod or like actuating member adjacent a panel. The clip is provided with means for engagement with one edge of a slotted opening provided in the panel, a tongue for gripping engagement with the opposite edge of the slotted opening, and means for retaining the rod or like member against lateral movement.

7 Claims, 5 Drawing Figures

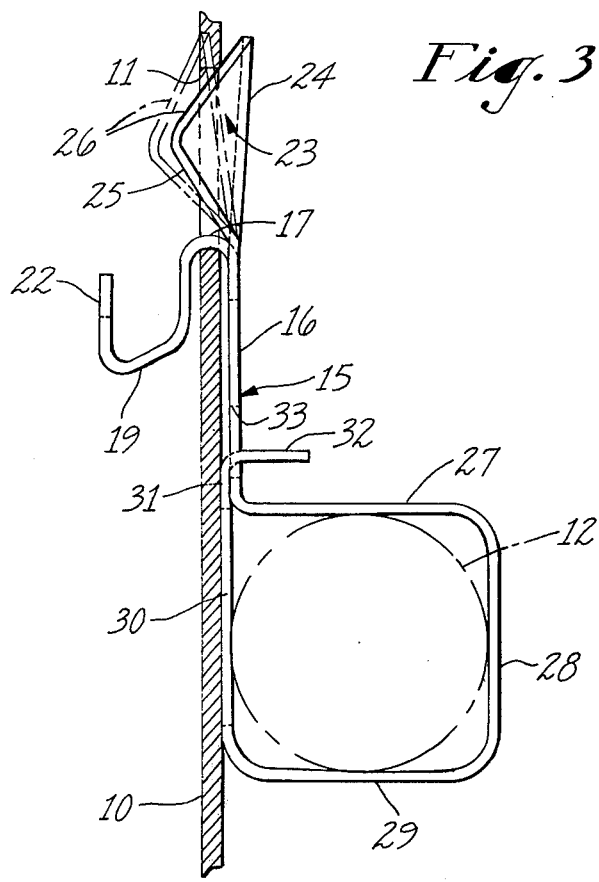
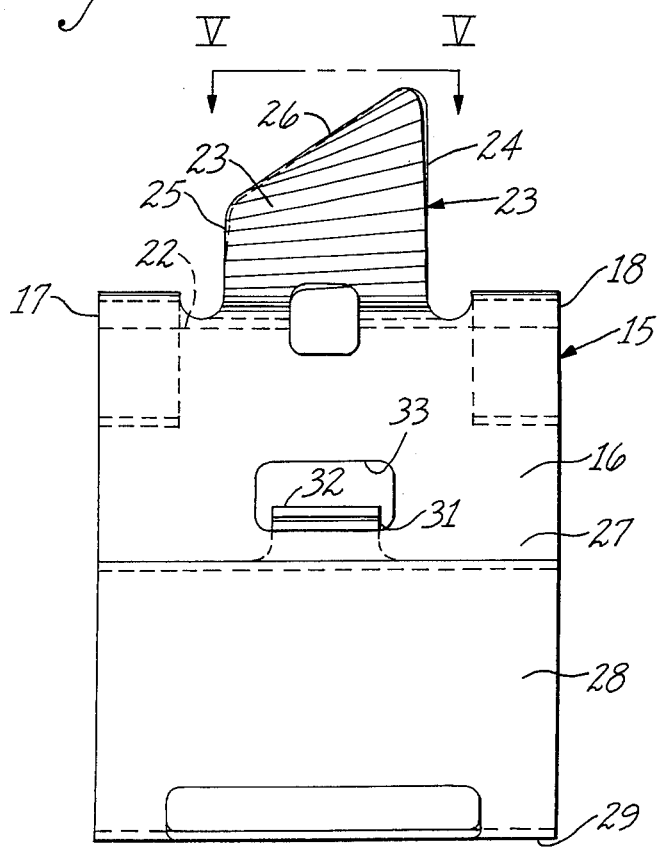
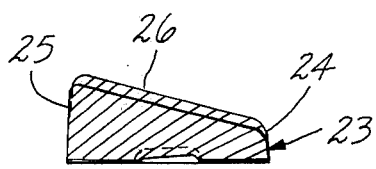

CLIP FOR REMOTE CONTROL ROD

BACKGROUND OF THE INVENTION

The present invention relates to a clip for retaining a rod or the like against lateral movement and more particularly to an antirattle device for use with a control rod.

In the manufacture of vehicles such as automobiles, aircraft, etc., there are many applications which require the remote control of a mechanical actuator to accomplish a desired operation. While in many instances electrical or hydraulic lines are employed to achieve the desired results, control rods of various types are still employed as a simple and dependable actuating means. In most of these applications also, the control rod must pass between walls, floors, etc. and in close proximity to the adjacent structure because of the space limitations within the vehicle.

Such an application is briefly discussed in copending U.S. Pat. application Ser. No. 474,304 filed May 30, 1974 in the name of Engelbert A. Meyer and assigned to the assignee of the present invention. This application discloses a pivotable plate or lock lever which is actuated by a displaceable link or rod, the angular end of which is received in a hole formed in the lock lever. The rod disclosed, of necessity, passes between the inner and outer door panels and has limited space for mounting. In addition, the ends of the rod are generally fastened to linkages which allow considerable lateral movement in the rod and, often, sufficient movement to allow contact with the adjacent panels.

In the past, various antirattle devices have been employed which, in general, may be cast, or formed of sheet metal, and are bolted to a panel having a rod or linking member slidably retained therein. Most of these devices have multiple components and therefore require the assembler to retain a stock of two or three elements, and tools such as a screw driver, wrench, etc. to assemble the antirattle device. In mass production, this can be time consuming and in many instances will add to the cost of assembly over a period of time.

SUMMARY OF THE INVENTION

The present invention therefore has as an object to provide an antirattle device for use with a linkage rod which is simple in construction and easy to assemble to retain the rod adjacent the panels, eliminating intermittent contact with the panels.

Another object of the invention is to provide an antirattle device in the form of a unitary clip which may be installed in an opening in a panel, which is effective to slidably engage the rod and retain it adjacent the panel.

A further object of the invention is to provide a device for retaining a slidable rod adjacent the panel which is simple in construction easy to assemble to the panel, and inexpensive to manufacture.

These objects of the invention and other objects which will be apparent as the description proceeds are achieved by providing a clip for retaining a rod or other element adjacent a panel having a substantially rectangular opening provided therein for engagement with the clip, wherein the clip comprises a base portion having a substantially planar rear surface which is located adjacent the panel. At the top of the base portion a pair of spaced means is disposed between the gripping the panel opening is provided and means disposed between the gripping means for engaging the upper edge of the panel opening in interfering engagement when the gripping means engages the lower edge of the panel opening. Means are further connected to the base for enclosing the element received therein and to thereby limit lateral displacement of the element.

BRIEF DESCRIPTION OF THE DRAWINGS

For a more adequate understanding of the invention, reference should be made to the following description of a preferred embodiment when read together with the accompanying drawing, in which:

FIG. 3 is a sectional view showing the clip assembled to the panel of FIG. 1, taken on an enlarged scale for clarity;

FIG. 4 is a front elevational view of the clip of FIGS. 1 through 3, showing details of the clip construction; and FIG. 5 is a partial top plan view taken along the line V—V of FIG. 4 showing a portion of the clip in detail.

DESCRIPTION OF THE PREFERRED EMBODIMENT

The preferred embodiment is directed particularly to a clip employed between the door panels of an automobile for retaining the lock rod against lateral movement and thereby preventing the resultant rattling within the automobile structure, during operation. However, it should be understood that the clip may be used for retaining any rod like element in either slidable or fixed relation to a panel.

Figure 1:
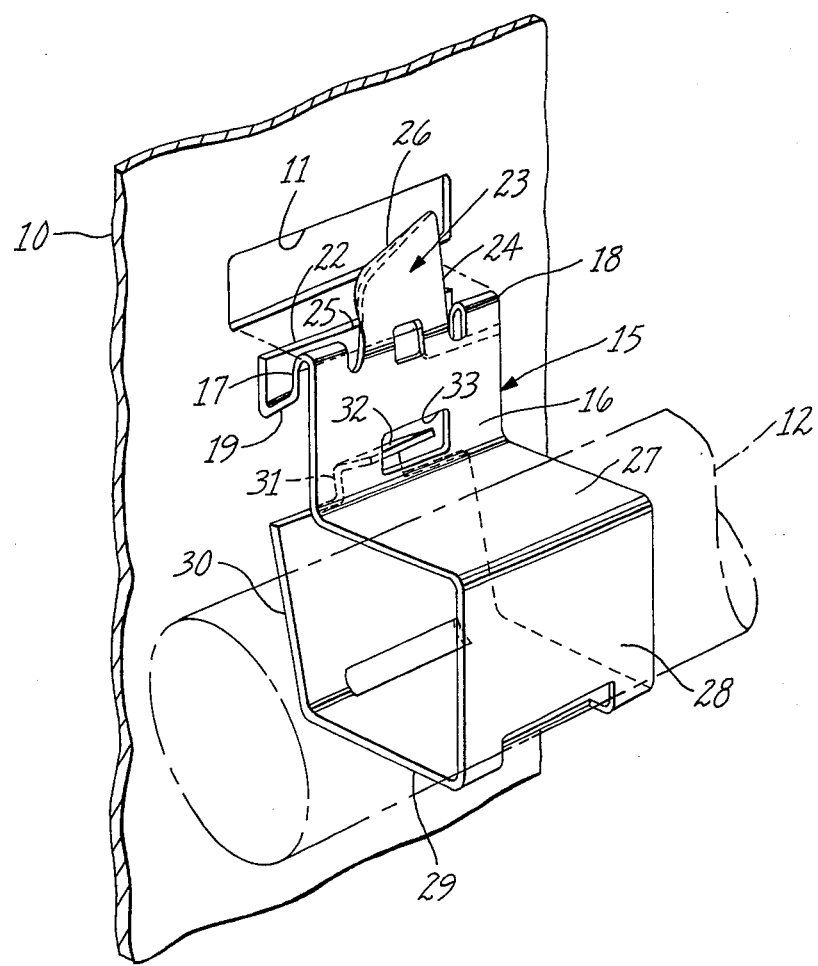
FIG. 1 is a perspective view, partially in section showing a panel for receiving a clip, the clip being constructed in accordance with the teachings of the present invention.

Referring now to the Figures of the drawing, and in particular to FIG. 1, there is shown an automobile sheet metal panel 10 having a rectangular opening 11 formed therein at a point adjacent which the rod 12 is to be assembled. The opening 11 may be stamped into the sheet metal panel 10 during fabrication which will eliminate the need for drilling or cutting tools to be employed during the assembly procedure.

Figure 2:
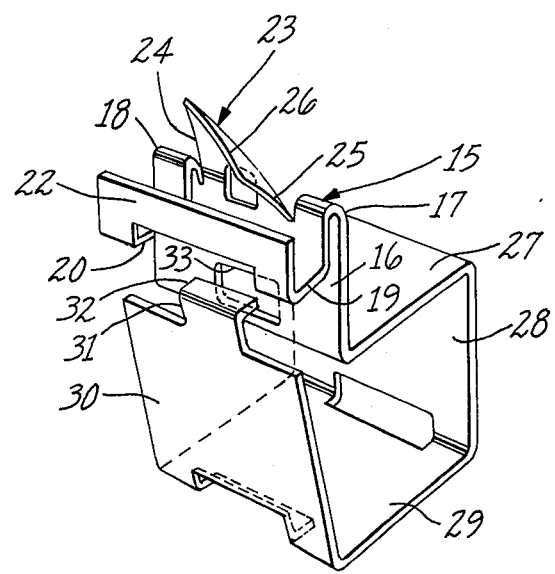
FIG. 2 is a perspective view showing the clip of FIG. 1 as viewed from the panel.

As best shown in FIGS. 2, 3 and 4, a clip 15 is provided for enclosing the rod 12 in a position adjacent the panel 10. The clip 15 may be manufactured from a unitary sheet of resilient material, as, for instance, SA 1050 spring steel having a thickness in the vicinity of 0.016 inch. The clip 15 will be considered to have a base portion 16 having a substantially planar rear surface to be disposed adjacent the front of the panel 10. The base portion 16 terminates at its upper end in a rearwardly extending radius forming a pair of gripping elements 17 and 18, each having a flange parallel to the base portion 16. At the lower end of the gripping elements 17 and 18 there is disposed an angular flange 19 and 20 respectively which serves to guide the gripping elements 17 and 18 over the lower surface of the opening 11 during assembly of the clip 15 onto the panel 10. For purposes of rigidity, the gripping elements 17 and 18 are connected by a connecting flange 22 extending upwardly from the rear of the angular flanges 19 and 20.

Between the gripping means 17 and 18 there is located a resilient tongue 23 having a lower surface substantially in the plane of the base portion 16, and extending upwardly therefrom. The resilient tongue 23 is shown in the relaxed position by phantom lines of FIG. 3 and has a side edge surface 24 extending upwardly and rearwardly from the plane of the base portion 16 and for a height greater than the height of the opening 11. The opposite side edge surface 25 extends upwardly and rearwardly from the plane of the base portion 16 to a height less than the height of the opening 11 and to a point rearward of the edge surface 24 forming a twist in the tongue 23. Thus, there is created an upper edge surface 26 which is disposed at an angle with the upper surface of the opening 11.

At the lower extremity of the base portion 16 means for enclosing a rod or other element comprises a box shaped structure formed to limit a lateral displacement of the rod 12 when enclosed therein. The box shaped structure comprises an upper wall 27 extending outwardly from the base portion 16, a front wall 28 and bottom wall 29, all substantially at right angles to one another, and a rear wall 30 resiliently movable to open and close the box structure. At the upper end of the rear wall 30 a tab 31 is formed having a substantially right angle locking flange 32. An opening 33 is formed in the base portion 16 to allow entry of the locking flange 32. With the locking flange 32 extending through the opening 33, the box like structure is in a form for retaining the rod 12 against displacement when contained therein.

In assembling the clip 15 onto the panel, the clip is initially assembled onto the rod 12 by inserting the rod through the opening between the wall 30 and the base portion 16, after which the resiliency of the clip allows the wall 30 to be snapped into position with the locking flange 32 extending through the opening 33.

The clip 15 is now positioned with the connecting flange 22 in alignment with the opening 11 and the connecting flange 22 and angular flanges 19 and 20 are moved through the opening to the rear of the panel 10. The clip 15 is now forced downwardly and the angular flanges 19 and 20 contact the lower edge of the opening 11 to guide the edge into the gripping elements 17 and 18. During this operation the following takes place. First, the rear wall 30 of the box like structure is forced into contact with the front of the panel 10, forcing the locking flange 32 through the opening 33 as shown in FIG. 3.

Additionally, the resilient tongue 23 moves toward the opening 11 and the side edge surface 25 extends through the opening, forcing the upper edge of the opening 11 into contact with the upper edge surface 26 of the tongue. The upper edge surface 26 of the tongue 23 bites into the upper edge of the opening 11, locking the assembly into position, the tongue assuming the position shown in solid lines of FIG. 3. Thus, the upper edge surface 26 has a wedge effect to lock the gripping elements 19 and 20 into position against vertical movement while the rear wall 30 is forced into contact with the panel 10, locking the box like structure to enclose the rod 12.

From the above description it should be evident that the clip 15 is adaptable to assemblies wherein close tolerances cannot economically be maintained. Both the widths and heights of the opening 11 need not be made to close tolerance as the clip 15 may be employed with an opening of unlimited width and the height of the opening need only be such that with the gripping elements 17 and 18 overlying the lower edge of the opening the upper opening falls somewhere between the height of the side edge surface 24 and the side edge surface 25 of the resilient tongue 23.

I claim:

1. A clip for retaining an element adjacent a panel having a substantially rectangular opening provided therein for engagement with the clip, said clip comprising a base portion having a substantially planar rear surface to be located adjacent the panel, a pair of spaced means disposed at the top of said base portion for gripping the lower edge of the panel opening, means disposed between said gripping means for engaging the upper edge of said panel opening providing interfering engagement between said gripping means and said engaging means, and said lower and upper panel opening edges respectively, and means connected to said base for enclosing an element received therein to limit lateral displacement of the element, said enclosing means comprising a box-shaped structure having one wall thereof disposed adjacent to and in parallel relation with the front surface of the panel, said wall being separable from said box structure at the upper corner thereof, an opening formed in said clip element adjacent said corner of said box-shaped structure and a tab extending from said wall structure and into said opening adjacent said corner to enclose the element within the box-shaped structure whereby said one wall is inseparable from said box structure with said clip engaged in the panel rectangular opening.

2. The structure of claim 1 wherein the clip is a unitary structure fabricated from a resilient material.

3. The structure of claim 1 wherein said means for gripping the lower edge of the panel opening comprises a pair of spaced U-shaped members, each member opening downwardly for gripping the lower edge of the panel opening between the U-forming legs of said member.

4. The structure of claim 1 wherein said means disposed between said gripping means comprises a resilient tongue extending upwardly from between said spaced gripping means, said tongue having a lower surface substantially in the plane of said base portion and one side edge surface extending upwardly and rearwardly from said lower surface for a height greater than said opening height, an opposite side edge surface of said tongue extending upwardly and rearwardly from said lower surface to a height less than the height of said opening and to a point rearward of the most rearward extent of said one side edge surface, and an upper edge surface connecting said two side edges whereby the upper edge surface is biased into interfering engagement with the upper edge of the opening when said gripping means is engaged with the lower edge of the opening.

5. The structure of claim 4 wherein said means for gripping the lower edge of the panel opening comprises a pair of spaced U-shaped members, each member opening downwardly for gripping the lower edge of the panel opening between the U-forming legs of said member.

6. A clip for retaining an element adjacent a panel having an opening provided therein for engagement with the clip, said clip comprising a pair of spaced U-shaped members, each member opening downwardly for gripping the lower edge of the panel opening between the U-forming legs of said member with the front legs of said member adjacent the front surface of the panel and the rear legs of said member adjacent the rear surface of the panel, a resilient tongue extending upwardly from between said U-shaped members, said tongue having a lower surface substantially in the plane of the U-shaped member front legs and one side edge surface extending upwardly and rearwardly from said lower surface for a height greater than said opening height, an opposite side edge surface of said tongue extending upwardly and rearwardly from said lower surface to a height less than the height of said opening and to a point rearward of the most rearward extent of said one side edge surface, and an upper edge surface connecting said two side edges whereby the upper edge surface of said tongue is biased into interfering engagement with the upper edge of the opening and said U-shaped members are in engagement with the lower edge of the opening, and means connected to said U-shaped members for enclosing an element received therein to limit lateral displacement of the element, said means comprising a box-shaped structure having one wall thereof disposed adjacent to and in parallel relation with the front surface of the panel, said wall being separable from said box structure at the upper corner thereof, an opening formed in said clip element adjacent said corner of said-box shaped structure and a tab extending from said wall structure and into said opening adjacent said corner to enclose the element within the box-shaped structure whereby said one wall is inseparable from said box structure with said clip engaged in the panel rectangular opening.

7. The structure of claim 6 wherein the clip is a unitary structure fabricated from a resilient material.

* * * * *